US010625303B1

(12) United States Patent
Hall et al.

(10) Patent No.: US 10,625,303 B1
(45) Date of Patent: Apr. 21, 2020

(54) CORN COB HARVESTING MACHINE

(71) Applicants: Michael E. Hall, Butterfield, MN (US); Daniel A. Hall, Butterfield, MN (US)

(72) Inventors: Michael E. Hall, Butterfield, MN (US); Daniel A. Hall, Butterfield, MN (US)

( * ) Notice: Subject to any disclaimer, the term of this patent is extended or adjusted under 35 U.S.C. 154(b) by 267 days.

(21) Appl. No.: 15/916,275

(22) Filed: Mar. 8, 2018

Related U.S. Application Data

(60) Provisional application No. 62/468,928, filed on Mar. 8, 2017.

(51) Int. Cl.
| | | |
|---|---|---|
| *B07B 9/02* | (2006.01) | |
| *A01D 41/00* | (2006.01) | |
| *A01D 89/00* | (2006.01) | |
| *B07B 13/10* | (2006.01) | |
| *B07B 4/00* | (2006.01) | |
| *A01D 41/10* | (2006.01) | |

(52) U.S. Cl.
CPC .............. *B07B 9/02* (2013.01); *A01D 41/10* (2013.01); *A01D 89/002* (2013.01); *B07B 4/00* (2013.01); *B07B 13/10* (2013.01)

(58) Field of Classification Search
CPC .... A01D 89/003; A01D 89/002; A01D 45/02; A01F 11/06; A01F 15/106; B07B 4/00; B07B 9/02; B07B 13/10
USPC .... 56/13.5, 16.5, 341, 364; 460/16, 46, 115, 460/149
See application file for complete search history.

(56) References Cited

U.S. PATENT DOCUMENTS

| | | | |
|---|---|---|---|
| 1,901,092 A | * | 3/1933 | Fisk ....................... A01D 41/10 56/364 |
| 2,797,543 A | | 7/1957 | Rasmussen |
| 2,843,992 A | | 7/1958 | Jones |
| 2,891,373 A | | 6/1959 | Bauer et al. |
| 2,935,834 A | | 5/1960 | Vaughn |
| 3,020,696 A | | 2/1962 | Thurow et al. |
| 3,193,998 A | | 7/1965 | Fredriks |
| 3,566,595 A | | 3/1971 | Milbrandt et al. |
| 3,828,534 A | | 8/1974 | McRobert |
| 3,863,430 A | | 2/1975 | Jennings |
| 3,872,657 A | | 3/1975 | Ramacher et al. |
| 3,946,541 A | | 3/1976 | Jennings |
| 3,961,465 A | | 6/1976 | Winings |
| 4,344,499 A | | 8/1982 | van der Lely et al. |
| 4,600,019 A | | 7/1986 | McBroom |

(Continued)

*Primary Examiner* — Robert E Pezzuto
(74) *Attorney, Agent, or Firm* — Albert W. Watkins

(57) ABSTRACT

A corn cob harvesting machine includes a tractor, cob harvester, and trailer that together lift, clean, and separate corn cobs from a corn harvester combine chaff windrow. The cob harvester has a floating cob lift immediately adjacent to and through various skirts engaging the earth that is supported by and floats with respect to a support frame. The floating cob lift has a rotary paddle that lifts and throws cobs into the first cross draft separator. The first cross draft separator has a blower that generates a vacuum within the floating cob lift. An adjustable flap intermediate between rotary paddle and blower deflects cobs and other heavier matter out of the air stream, while lighter matter is removed. A first cross draft separator removes chaff, a rock trap separates rocks, and a second cross draft separator removes additional chaff. A discharge conveyor transfers cleaned corn cobs to the trailer.

19 Claims, 9 Drawing Sheets

(56) References Cited

U.S. PATENT DOCUMENTS

| | | | | |
|---|---|---|---|---|
| 4,892,505 | A * | 1/1990 | Shrawder | A01D 45/02 |
| | | | | 460/149 |
| 5,001,893 | A | 3/1991 | Stanley et al. | |
| 5,941,768 | A | 8/1999 | Flamme | |
| 6,358,141 | B1 | 3/2002 | Stukenholtz et al. | |
| 7,524,242 | B2 | 4/2009 | Stukenholtz et al. | |
| 7,566,266 | B1 | 7/2009 | Ricketts et al. | |
| 7,717,778 | B2 | 5/2010 | Redekop et al. | |
| 7,818,954 | B2 | 10/2010 | Rempe et al. | |
| 7,837,542 | B1 | 11/2010 | Ricketts et al. | |
| 8,712,787 | B2 | 4/2014 | Homme et al. | |
| 8,801,513 | B2 | 8/2014 | Ricketts et al. | |
| 9,027,319 | B1 | 5/2015 | Di Anna | |
| 9,730,380 | B2 * | 8/2017 | Nilson | A01D 33/08 |
| 2017/0367263 | A1 * | 12/2017 | Robert | B07B 1/46 |

* cited by examiner

CORN COB HARVESTING MACHINE

CROSS REFERENCE TO RELATED APPLICATIONS

The present application claims the benefit of U.S. provisional patent application 62/468,928 filed Mar. 8, 2017 of like title and inventorship, the teachings and entire contents which are incorporated herein by reference.

BACKGROUND OF THE INVENTION

1. Field of the Invention

This invention pertains generally to harvest machines, and more particularly to a machine adapted to passing over an already harvested corn field to retrieve substantially clean and dried corn cobs therefrom.

2. Description of the Related Art

In the harvesting of a corn field, the most valuable component is the kernel corn, also commonly referred to as shelled corn. There are many high value uses for shelled corn, including but not solely limited to animal feed.

In some cases, ear corn which includes the cob may be desired or even preferred as feed. Nevertheless, the addition of the cobs decreases the energy density of the feed, thereby requiring much more storage space than shelled corn requires.

Corn cobs also have separate utility. They may be dried, and then burned as fuel. When dry, they are sufficiently energy dense as to be a valuable a secondary fuel source. However, as aforementioned, in order for corn cobs to be of value directly as a fuel, they must first be dried. If the drying process requires a crop drier that is fueled by a separate fuel such as propane, then the cost of the propane offsets any value obtained from the dry cobs, meaning the cobs are of no value. Dry cobs may also be used for animal bedding, and also as an ingredient used to make compost. As an alternative to drying the cobs, wet cobs may be processed into stover and used either as feed or as a feedstock in the production of ethanol.

The stalks, leaves, and other plant matter from a corn stalk are substantially less energy dense than even the cob, and so are generally not considered to even be worth the effort of even removing them from the field. As a result, these stalks, leaves, other plant matter, and even the non-plant matter that may inadvertently enter a harvester are collectively referred to as chaff.

Older corn harvesters or corn pickers mechanized the corn picking process of manually cutting ears from the stalk. The corn harvester separated ears of corn from stalks and leaves, and stored the ear corn in a bin. These mechanized corn pickers would separate the chaff from the ear corn, and discharge the chaff back to the field. The ear corn would then be transported to a remote storage location. In most cases, the ear corn would be dried for later processing through a shelling machine designed specifically to separate corn kernels from the cobs.

In good conditions, this process was both effective and efficient. Unfortunately, as all farms understand, weather and equipment rarely both unite to yield good conditions. Ear corn must be at a proper moisture content before storage, and drying of the ear corn to such moisture content is complicated and delayed by the presence of the cob. In addition, and as noted herein above, the bin required to hold ear corn is much larger. This applies not only to the long term storage, but also to the bin used on a harvester to hold the ear corn. Consequently, harvesting ear corn requires much more frequent emptying of the bin, followed by more complicated drying.

In addition, the harvest requires several distinct steps, each which consume time. The first is the mechanical harvest of the ears. The second is the transport of the ear corn to drying and storage. This transport necessarily requires more time than would be required for shelled corn, owing to the increase in both mass and substantial increase in volume due to the presence of the cobs. The third step is the separate shelling process.

In consideration of these limitations of corn harvesters, a newer machine generally referred to as a combine harvester or simply a combine will not only harvest the ear corn, but will also simultaneously shell (separate) the corn from the cob. Rather than requiring two separate and distinct steps for harvesting and shelling, both occur simultaneously within the combine, saving much labor. In the process, the combine will discharge shelled corn into a secondary receptacle which may either be an onboard bin, or a trailing or adjacent trailer. All plant matter other than the shelled corn is discharged into a small windrow onto the earth behind the combine. This discharge of cobs as a part of the chaff also saves much time by reducing the matter being transported to just the shelled corn. While at one time the plant matter chaff was theorized to be beneficial if turned into the soil, that has since been proven to be incorrect. As a result, the cobs, stalks, husks, and other plant matter will often be left on the surface of the field as unutilized waste that is of no further benefit to the farm. As noted above, the second most valuable part of the corn stalk, the cob, is thus left by most combines as waste in the field.

The chaff left behind the combine may be quite slow to decompose. This is particularly true in those climates with a prolonged winter freeze, and for those components of the chaff that are naturally slower to decompose, such as the cob. This undecomposed chaff can interfere with crop production in the next growing season, by clogging tillers, interfering with plant germination, and interfering with consistent fertilizer application. So not only is the combine chaff left as waste, it may interfere with production during the coming growing season.

Recognizing this loss of value, some artisans have designed apparatus and methods of collecting the chaff left by a combine. Exemplary U.S. patents and published applications, the teachings which are incorporated herein by reference, include: U.S. Pat. No. 7,818,954 by Rempe et al, entitled "Corn stalk baling method and apparatus"; and U.S. Pat. No. 8,712,787 by Homme et al, entitled "Systems and methods for managing and utilizing excess corn residue". While beneficial for those operations wishing to convert the combine chaff to feed or ethanol, these machines do not enable a farm to economically collect any of the chaff for drying and use as a combustible fuel.

As an alternative to either leaving chaff in the field or separately collecting plant matter separated by the combine from shelled corn, other artisans have designed harvesting combines that will simultaneously separate and save both shelled corn and cobs into separate receptacles. Exemplary U.S. patents, the teachings which are incorporated herein by reference, include: U.S. Pat. No. 6,358,141 by Stukenholtz et al, entitled "Combine system for harvesting, cleaning and storing both corn kernels and whole cobs, and method of use"; U.S. Pat. No. 7,524,242 by Stukenholtz et al, entitled "Collecting kernels of corn and cobs"; U.S. Pat. No. 7,566, 266 by Ricketts et al, entitled "Dual action corn cob separation and improved chaffer for whole corn cobs"; U.S. Pat. No. 7,717,778 by Redekop et al, entitled "Separating cobs from grain in a corn harvester"; U.S. Pat. No. 7,837,542 by Ricketts et al, entitled "Corn cob cleaning system"; and U.S. Pat. No. 8,801,513 by Ricketts et al, entitled "Corn cob conveying and cleaning system using induction and air flow from a harvester for separating and spreading light crop residue". A similar patent, the teachings which are incorporated herein by reference, is U.S. Pat. No. 5,941,768 by Flamme, entitled "Corn cob collecting apparatus for use with a combine". This patent describes an apparatus pulled behind a combine to collect cobs. However, these combine cob collectors can slow down the shelled corn harvest. To collect both cobs and corn during the harvest, collection vehicles or trailers must be provided for both the corn and the cobs. The extra capabilities also will increase the likelihood of equipment breakdowns that can delay the harvest of the most valuable crop, which is the corn. Finally, the combine is a very expensive and already complex machine, and the addition of these extra capabilities comes at great expense. In consideration of the extra time and risk to the successful harvest of the most valuable component, shelled corn, most farms still prefer to drop the cobs as waste in the field.

Even if a farm chooses to operate a combine that simultaneously separates and saves the cobs during harvest, further challenges may arise. At the time of combining, the corn will either be sufficiently dry to harvest and store, or the weather has not permitted the corn to completely dry but it will be economically viable to further dry the corn using well known agricultural dryers. However, the cobs will almost always still be too moist to be stored, and yet they cannot normally be dried economically.

By leaving the cobs in the field for as little as 48 additional hours after combining, the cobs may dry from 30% moisture down to 15%, at which point they may be stored for later use. To accomplish this requires equipment that may be operated to pick up the cobs from the ground.

A number of artisans have designed various equipment to pick up various types of plant matter from a field. Exemplary U.S. patents and published applications, the teachings which are incorporated herein by reference, include: U.S. Pat. No. 2,797,543 by Rasmussen, entitled "Ear corn pickup equipment for corn harvesters"; U.S. Pat. No. 2,843,992 by Jones, entitled "Ear pick-up attachment for a corn harvester"; U.S. Pat. No. 2,891,373 by Bauer et al, entitled "Machine for gathering down ears of corn"; U.S. Pat. No. 2,935,834 by Vaughn, entitled "Corn ear pick-up device"; U.S. Pat. No. 3,020,696 by Thurow et al, entitled "Combine attachment for retrieving down ears of corn"; U.S. Pat. No. 3,193,998 by Fredriks, entitled "Pick-up unit for nut harvesting"; U.S. Pat. No. 3,566,595 by Milbrandt et al, entitled "Apparatus for picking ears of corn from the ground"; U.S. Pat. No. 3,828,534 by McRobert, entitled "Article pickup machine"; U.S. Pat. No. 3,863,430 by Jennings, entitled "Corn pick-up device"; U.S. Pat. No. 3,872,657 by Ramacher et al, entitled "Harvester pick-up"; U.S. Pat. No. 3,946,541 by Jennings, entitled "Method of picking up corn"; U.S. Pat. No. 3,961,465 by Wirings, entitled "Vacuum harvesting machine"; U.S. Pat. No. 5,001,893 by Stanley et al, entitled "Tractor powered nut harvester"; and U.S. Pat. No. 9,027,319 by Di Anna, entitled "Nut tree pickup and debris separator". While each of these patents illustrate various potentially useful features and components, applying these machines and teachings to the particular application of collecting dried cobs from a combine windrow still requires several distinct steps and processes, undesirably burdening a farm and rendering the cobs uneconomical to collect and use. As a result, standard agricultural practice is still to leave the combine windrow, including the cobs, in the field to eventually decompose.

Additional patents of less relevance, but the relevant teachings and contents which are incorporated herein by reference, include: U.S. Pat. No. 4,344,499 by van der Lely et al, entitled "Tractor with anti-slipping and overloading controls"; and U.S. Pat. No. 4,600,019 by McBroom, entitled "Corn cob saver sieve for combines". In addition to the foregoing patents, Webster's New Universal Unabridged Dictionary, Second Edition copyright 1983, is also incorporated herein by reference in entirety for the definitions of words and terms used herein.

As may be apparent, in spite of the enormous advancements and substantial research and development that has been conducted, there still remains a need for a machine that can efficiently harvest field dried cobs left in the field after combining.

SUMMARY OF THE INVENTION

In a first manifestation, the invention is a cob harvester adapted to lift corn cobs and chaff from within a corn harvester combine chaff windrow formed on the surface of the earth, and clean and separate corn cobs from chaff. A cob lift is positioned immediately adjacent to and above a surface of the earth and is adapted to lift corn cobs and chaff from the corn harvester combine chaff windrow. A first cross draft separator is adapted to receive lifted corn cobs and chaff from the cob lift and separate chaff therefrom. A second cross draft separator is adapted to receive chaff-separated corn cobs and chaff, and separate chaff therefrom and thereby generate cleaned and separated corn cobs.

In a second manifestation, the invention is a second pass corn cob harvesting machine adapted to lift corn cobs and chaff from within a corn harvester combine chaff windrow formed on the surface of the earth, and clean and separate said corn cobs from said chaff. The second pass corn cob harvesting machine comprises, in combination, a tractor, a cob harvester, and a trailer configured to receive corn cobs lifted and cleaned by the cob harvester. The tractor has a tractor-supported trailer hitch; a motive drive system having an engine and configured to move the tractor and an implement coupled to the trailer hitch; and a power take off configured to transmit power from the engine to the trailer-hitch coupled implement. The cob harvester has a frame; a wheel set affixed to the frame; a harvester-supported coupling hitch affixed to the frame and removably coupled to the tractor-supported trailer hitch; a harvester-supported trailer hitch affixed to the frame; a floating cob lift immediately adjacent to the earth, supported by and floating with respect to the frame, the floating cob lift adapted to lift corn cobs and chaff from the corn harvester combine chaff windrow; a first cross draft separator adapted to receive lifted corn cobs and chaff from the floating cob lift, and subsequently separate chaff therefrom; a rock trap adapted to receive chaff-separated corn cobs and chaff from the first cross draft separator, and subsequently separate rocks therefrom; a second cross draft separator adapted to receive rock and chaff-separated corn cobs and chaff from the rock trap, and subsequently separate chaff therefrom and thereby generate the lifted and cleaned corn cobs; and a discharge conveyor adapted to discharge the lifted and cleaned corn cobs from said cob harvester. The trailer has a trailer-supported coupling hitch coupled to the harvester-supported trailer hitch; and a receptacle adapted to receive lifted and cleaned corn cobs from the cob harvester.

OBJECTS OF THE INVENTION

Exemplary embodiments of the present invention solve inadequacies of the prior art by providing second pass corn cob harvesting machinery that is used to process a field-dried corn harvesting combine windrow to extract dried cobs, while removing nearly all of the chaff and contaminants from the cobs.

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to provide a machine that can efficiently harvest field dried cobs left in windrows in the field after combining. A second object of the invention is to provide such a machine that does not interfere with the combining of high value shelled corn, and that will remove cob residue that might otherwise interfere with corn production in a subsequent season. Another object of the present invention is to use a tractor as a source of motive and hydraulic power for the cob harvest, the tractor which may be operated at much lower cost than a combine and which is available for use at the convenience of the operator on essentially all modern farms. A further object of the invention is to provide a highly effective ground following pickup that includes a combination of vacuum and a rotary paddle to lift and throw cobs into the first stage separator. Yet another object of the present invention is to provide a two-stage cross-draft separation of lighter material out of the stream of cobs, the stages separated by an additional separator stage in the form of an integrated rock trap that removes rocks from cobs. An additional object of the invention is to incorporate a self-contained hydraulic system used to drive and variably speed control conveyors and vacuum fans.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
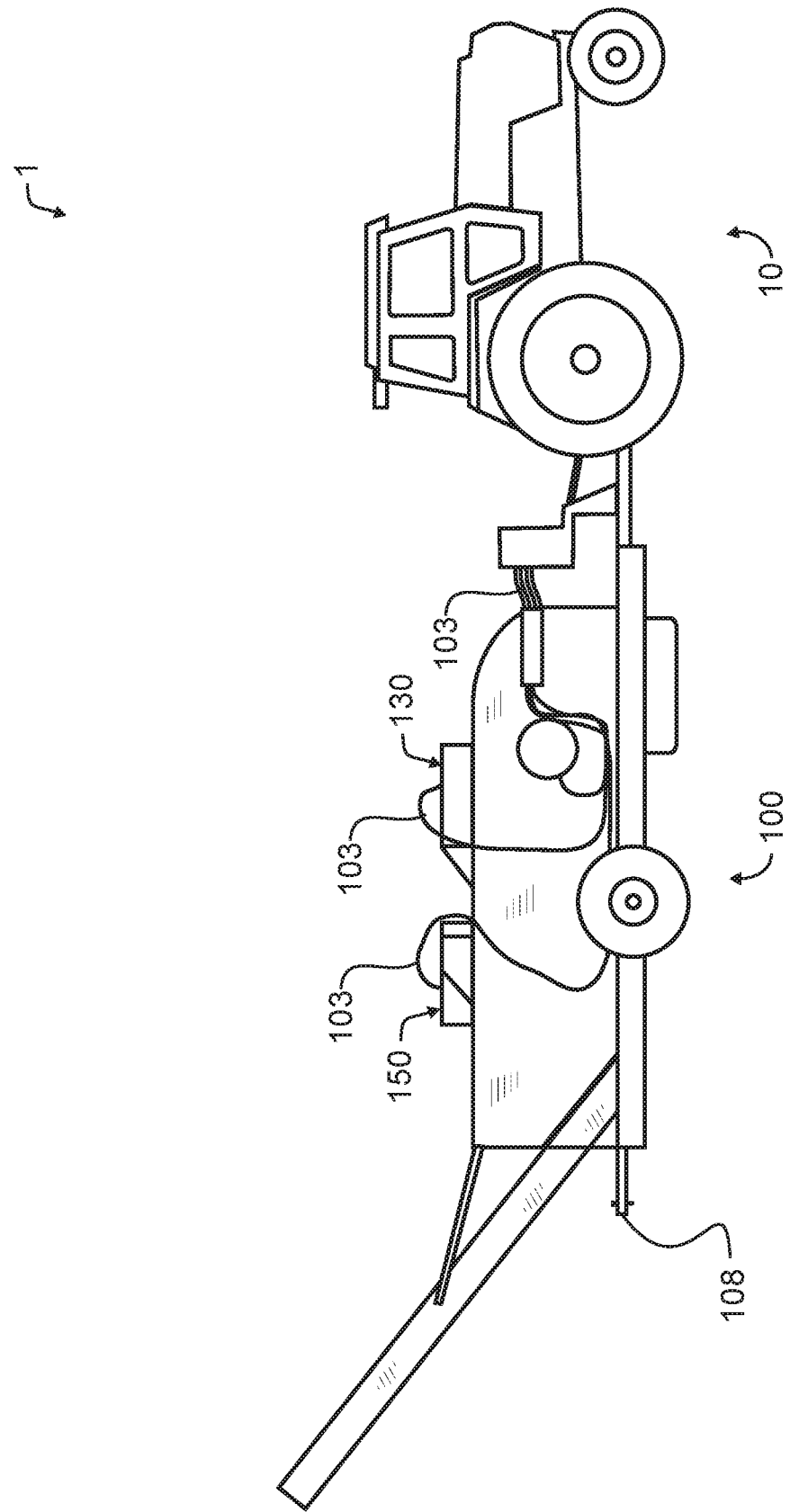
FIG. 1 illustrates a preferred embodiment second pass corn cob harvesting machine designed in accord with the teachings of the present invention from a left side elevational view. For the purposes of the present disclosure, the left and right sides are determined when facing and viewing the leading edge of the second pass corn cob harvesting machine.

In a preferred embodiment of the invention illustrated in FIG. 1, second pass corn cob harvesting machinery 1 is comprised of a prior art tractor 10 and preferred embodiment cob harvester 100. Tractor 10 provides a source of both motive and drive power necessary for preferred embodiment cob harvester 100 to function. As is known, tractors are provided with standard hitches to which preferred embodiment cob harvester 100 may readily be coupled. In addition, tractors are also provided with a power take-off (PTO) shaft that enables transfer of relatively large amounts of power directly from the tractor engine into preferred embodiment cob harvester 100. Since nearly every modern agricultural operation has at least one tractor available with sufficient capability and configuration, a tractor such as prior art tractor 10 is preferred. Nevertheless, for the purposes of the present invention any other suitable vehicle may be used to tow and power preferred embodiment cob harvester 100.

While not separately illustrated, second pass corn cob harvesting machinery 1 will also preferably incorporate some type of receptacle to receive and retain harvested corn cobs. In a preferred embodiment, a trailer is coupled through trailer hitch 108 to a frame 104 of preferred embodiment cob harvester 100. The trailer for exemplary and non-limiting purpose may be open on top and positioned to trail underneath the discharge of conveyor 170. Such trailer, for exemplary and non-limiting purposes, may comprise a prior art high dump trailer. A high dump trailer provides a convenient temporary receptacle for receiving and transporting corn cobs during cob harvest, which preferably may be readily unloaded at a longer term storage container or facility. While a high dump trailer is preferred, any suitable receptacle may be used to receive the harvested and cleaned corn cobs provided by and discharged from preferred embodiment cob harvester 100. A trailer of sufficient volume facilitates the storage of a substantial number of cobs, reducing the number of trips required to transfer the cobs to a storage receptacle, while a dump trailer facilitates rapid discharge of the cobs from the trailer. Nevertheless, in an alternative embodiment contemplated herein, cob harvester 100 may be extended vertically and provided with a suitable storage receptacle adjacent a top thereof. In such alternative embodiment, appropriate care must be taken to avoid undesirable interference, either direct mechanical interference or interference with proper function or serviceability, of components adjacent the top, such as blowers 131, 151. Further, vertical height is not limitless, since such height may for exemplary purpose interfere with machine storage and safe operation in high winds. In a further alternative embodiment, a hopper may be provided within preferred embodiment cob harvester 100, most preferably adjacent to the trailing end, close by and subsequent to second stage cross draft separator 150.

Figure 2:
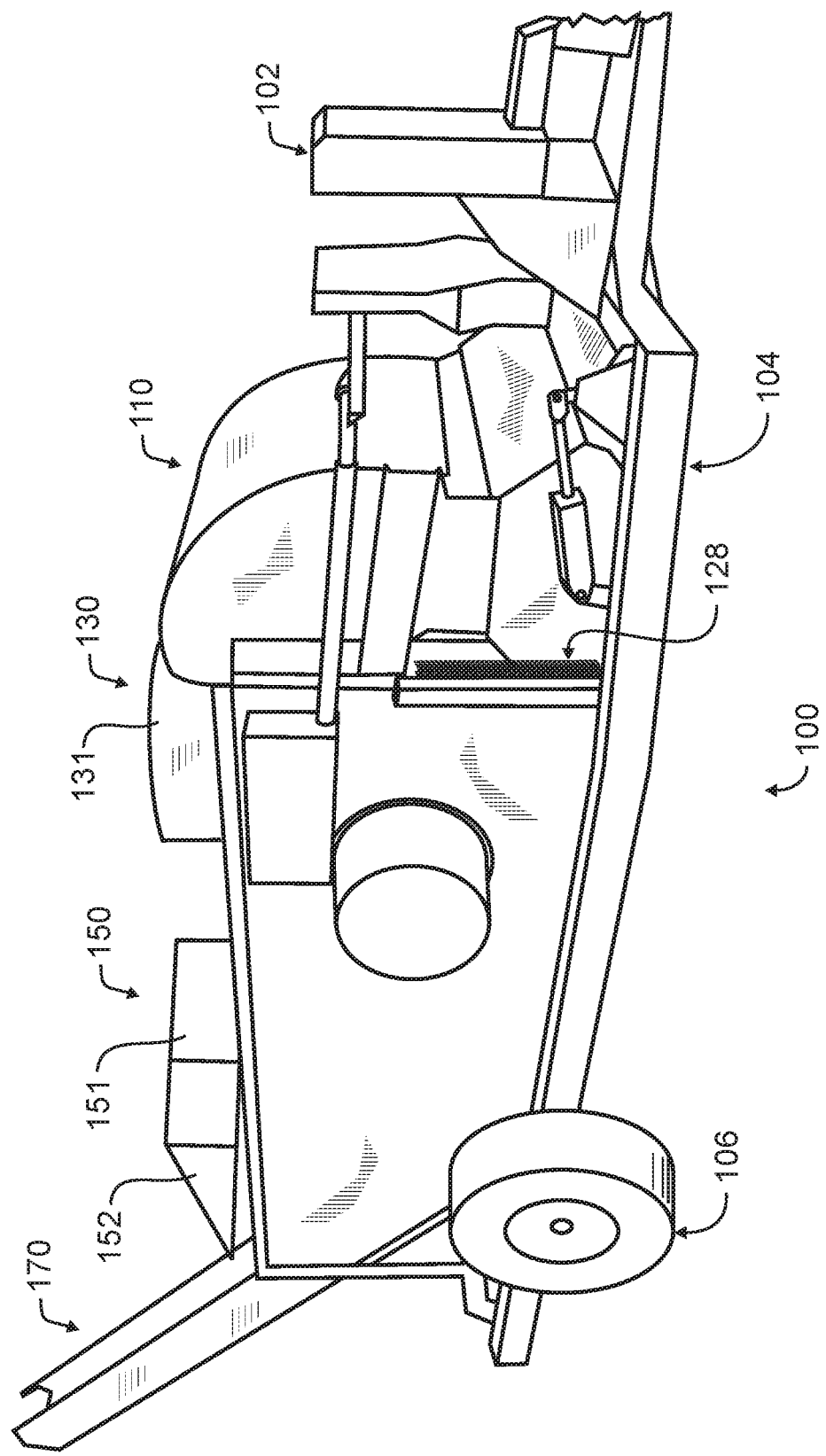
FIG. 2 illustrates the preferred embodiment cob harvester used in the second pass corn cob harvesting machine of FIG. 1 from a left side and front projected view
Figure 3:
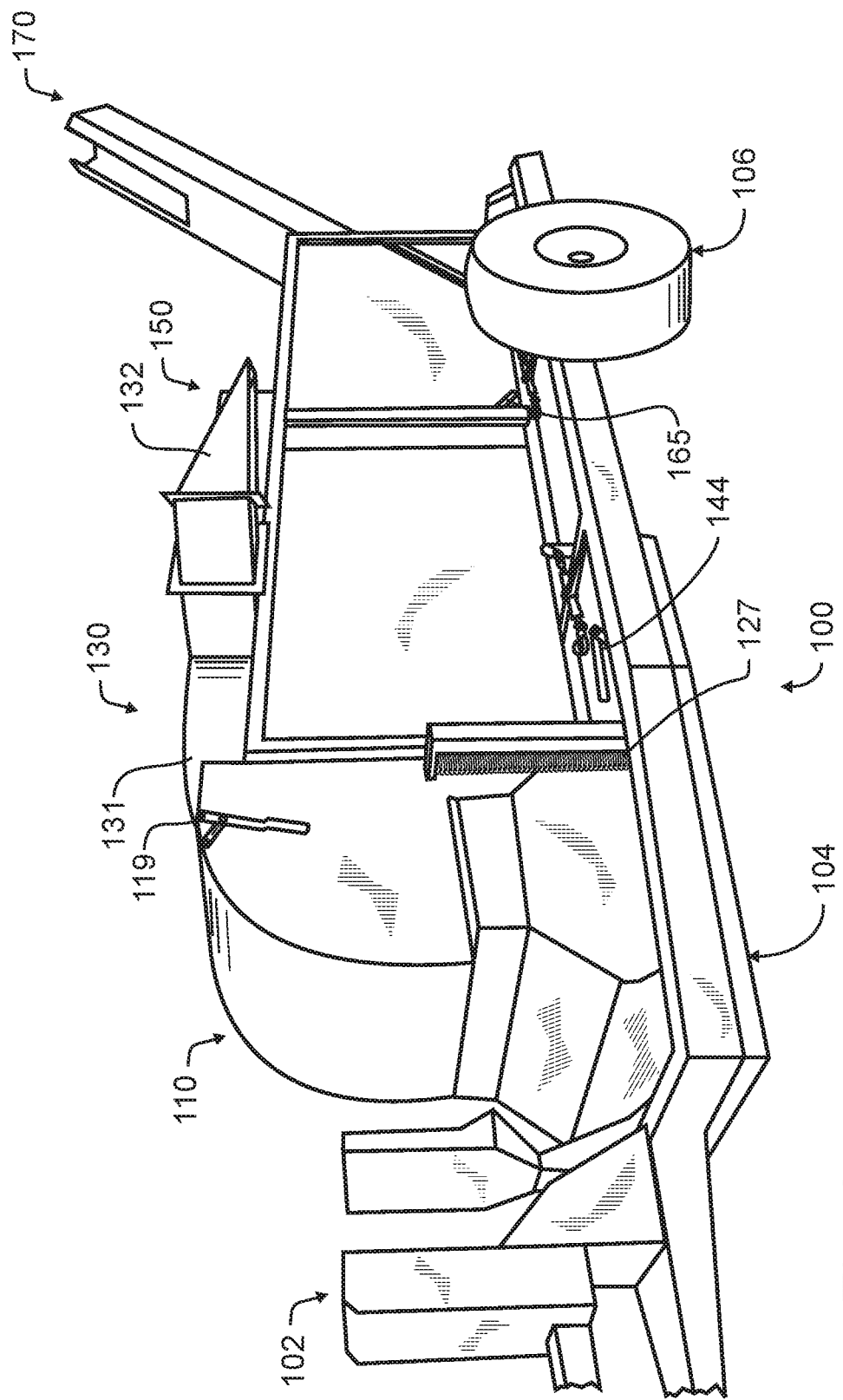
FIG. 3 illustrates the preferred embodiment cob harvester of FIG. 2 from a right side and front projected view.
Figure 4:
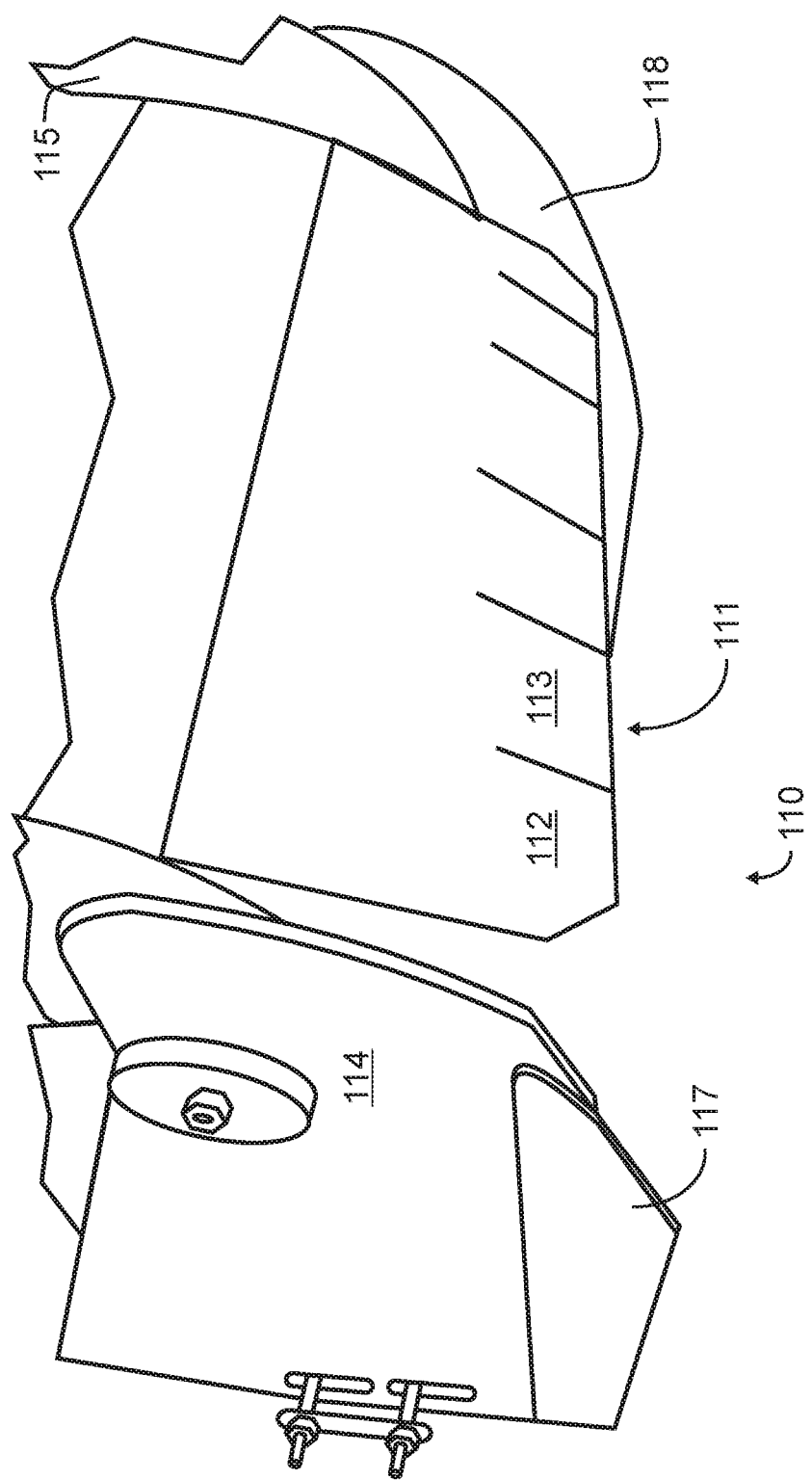
FIGS. 4-7 illustrate a preferred embodiment cob lift used in the cob harvester of FIG. 2 from a left side and front projected view, front and bottom projected view, left side and rear projected view, and left side and front and top projected view, respectively.

FIGS. 2 and 3 illustrate preferred embodiment cob harvester 100 from left and right sides, showing the major components. A frame 104 provides solid mechanical support for each of the major systems within cob harvester 100, while movement of the entire assembly over the ground is enabled by wheel set 106 extending therefrom. At the leading or front end of frame 104 a power take-off hydraulic pump 102 is provided that is preferably driven by the tractor PTO shaft. This in turn converts the drive power from the rotating PTO shaft into pressurized hydraulic fluid that may be distributed through hydraulic lines 103 visible in FIG. 1 to drive the primary powered components of cob harvester 100. While visible in FIG. 1, hydraulic lines 103 have been removed from the remaining drawing Figures to avoid unnecessary clutter and confusion in the remaining Figures.

The primary powered components include a cob lift 110, a cross draft separator 130, a second stage cross draft separator 150, and a conveyor 170.

As noted herein above, during the combining of a corn field, the combine will separate the corn from the cobs, stalks, husks, and other plant matter. This plant matter will be dropped into a narrow windrow. These windrows are preferably left in the field for sufficient time to allow the cobs to dry to a point where they may be stored for later use.

Once the cobs have dried adequately, for exemplary and non-limiting purposes to a moisture content of 15% or less, cob harvester 100 may be pulled by tractor 10 along the windrow of corn cobs, stalks, husks, leaves, and other debris left by a prior art corn harvesting combine. The windrow is lifted within cob lift 110 using a combination of vacuum generated by blower 131 and a rotary paddle set having a plurality of teeth 122 visible in FIG. 5. The debris including corn cobs is thrown into cross draft separator 130. Blower 131 within cross draft separator 130 not only draws the combine debris up off the ground, it also pulls light and foreign material out, leaving a stream of cobs, rocks, and a small amount of remaining stalks, husks, and the like.

This light material might in some alternative embodiments by collected and stored for later use as animal bedding or the like. However, in the preferred embodiment the cobs are collected for later burning in special burners that produce a substantial amount of heat. In consideration thereof, the light material offers very little value and contains a substantial amount of dirt and other debris, and so in preferred embodiment cob harvester 100 this material is discharged to the right side of cob harvester 100, out of discharge chute 132 visible in FIG. 3.

An integrated rock trap 164 best visible and described with reference to FIG. 9 removes rocks from the cobs, and the remaining plant matter is separated in a second stage cross draft separator 150. A blower 151 within second stage cross draft separator 150 is used to pull any remaining light and foreign material out of the stream of cobs, while second stage cross draft separator 150 simultaneously tumbles the cobs as will be explained below to free any remaining lighter matter that might be trapped between adjacent cobs. This remaining lighter debris that is separated by second stage cross draft separator 150 is discharged to the left side of cob harvester 100, out of discharge chute 152 visible in FIG. 2. The now substantially cleaned cobs are elevated out of cob harvester 100, for exemplary and non-limiting purposes into a high dump trailer that may be coupled through trailer hitch 108 and pulled behind second pass corn cob harvesting machinery 1.

FIGS. 4-7 illustrate preferred embodiment cob lift 110 in greater detail. As visible in FIG. 4, a pliant skirt 111 is provided on the leading edge of cob lift 110, simultaneously admitting material into the interior of cob lift 110 while also providing an obstruction to the flow of air. This ensures that there is a relatively powerful flow of air adjacent to the ground which is contained within cob lift 110, and which is thereby efficiently directed to assist in lifting the cobs from the ground. Most preferably, skirt 111 is sufficiently pliant as to safely accommodate irregularities within the earth, such as large rocks and the like, that might be encountered, and which will also accommodate different windrow densities or thicknesses. As will be appreciated, a solid skirt sufficiently rigid to slide over a rock without damage may also simply scrape the earth and push or plow cobs away, rather than admitting them into the interior of cob lift 110. To better facilitate the admission of cobs into cob lift 110, pliant skirt 111 may further be provided with slots dividing skirt 111 into a plurality of fingers 112, 113. For exemplary and non-limiting purpose, pliant skirt 111 may comprise a relatively thick and heavy rubber sheet.

Along the left side of cob lift 110, a left side wall sealing plate 114 is provided, and a similar right side wall sealing plate 115 is provided opposite thereto. These sealing plates 114, 115 are cooperative with pliant skirt 111, trailing plate 116 visible in FIGS. 5 and 6, and the earth to drive a strong air flow into cob lift 110 through the gap between pliant skirt 111 and the earth.

To facilitate adjustability of the height of sealing plates 114 and 115, additional sealing flanges 117, 118 are preferably provided that are most preferably slidably affixed to the associated sealing plate. This ensures that the bottom of cob lift 110 will track with the surface of the ground, since each sealing flange 117, 118 may lift relative to the associated one of sealing plates 114, 115 when a high spot in the ground is encountered. In other words, and with reference to FIG. 4, if the earth beneath sealing flange 117 drops lower than the earth beneath sealing flange 118, then sealing flange 117 will drop relative to sealing plate 114 more than sealing flange 118 will extend from sealing plate 115, thereby keeping both sealing flange 117 and 118 in contact with the ground even when the ground is not even or level. Since these sealing plates 114, 115 and sealing flanges 117, 118 run parallel to the direction of travel, there is only minimal scraping of the earth during operation, with no consequential plowing or accumulation of soil.

Sealing flanges 117, 118 may be pliant, but in the preferred embodiment they are fabricated from relatively rigid plate material such as steel. Since they are being slid in ground contact, they are desirably relatively durable, and for this purpose steel is preferred. Furthermore, by making them rigid, they are less likely to deform during use, meaning they will remain in line with the direction of travel even when a localized force is applied along a small part of the bottom edge.

Figure 5:
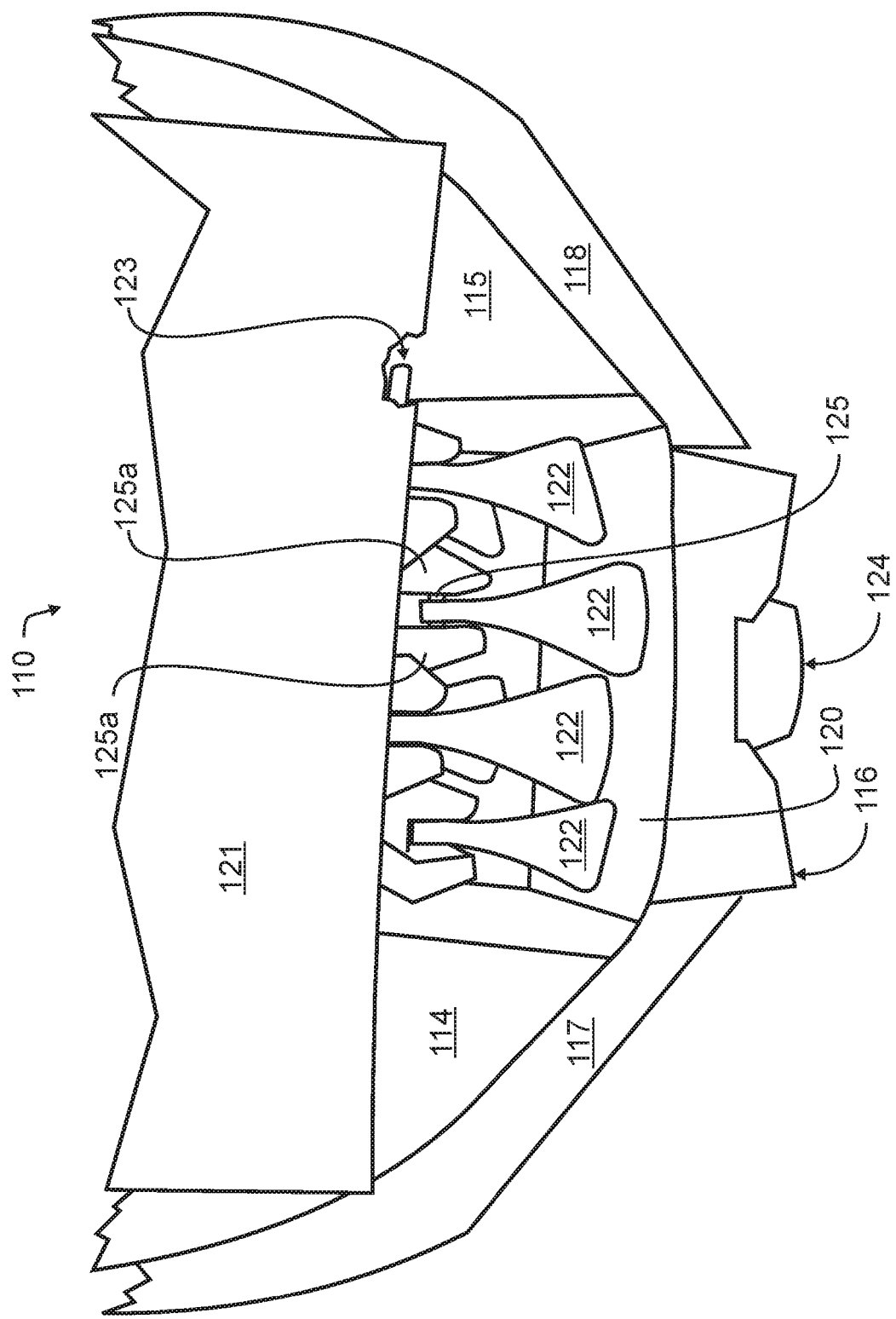
Figure 6:
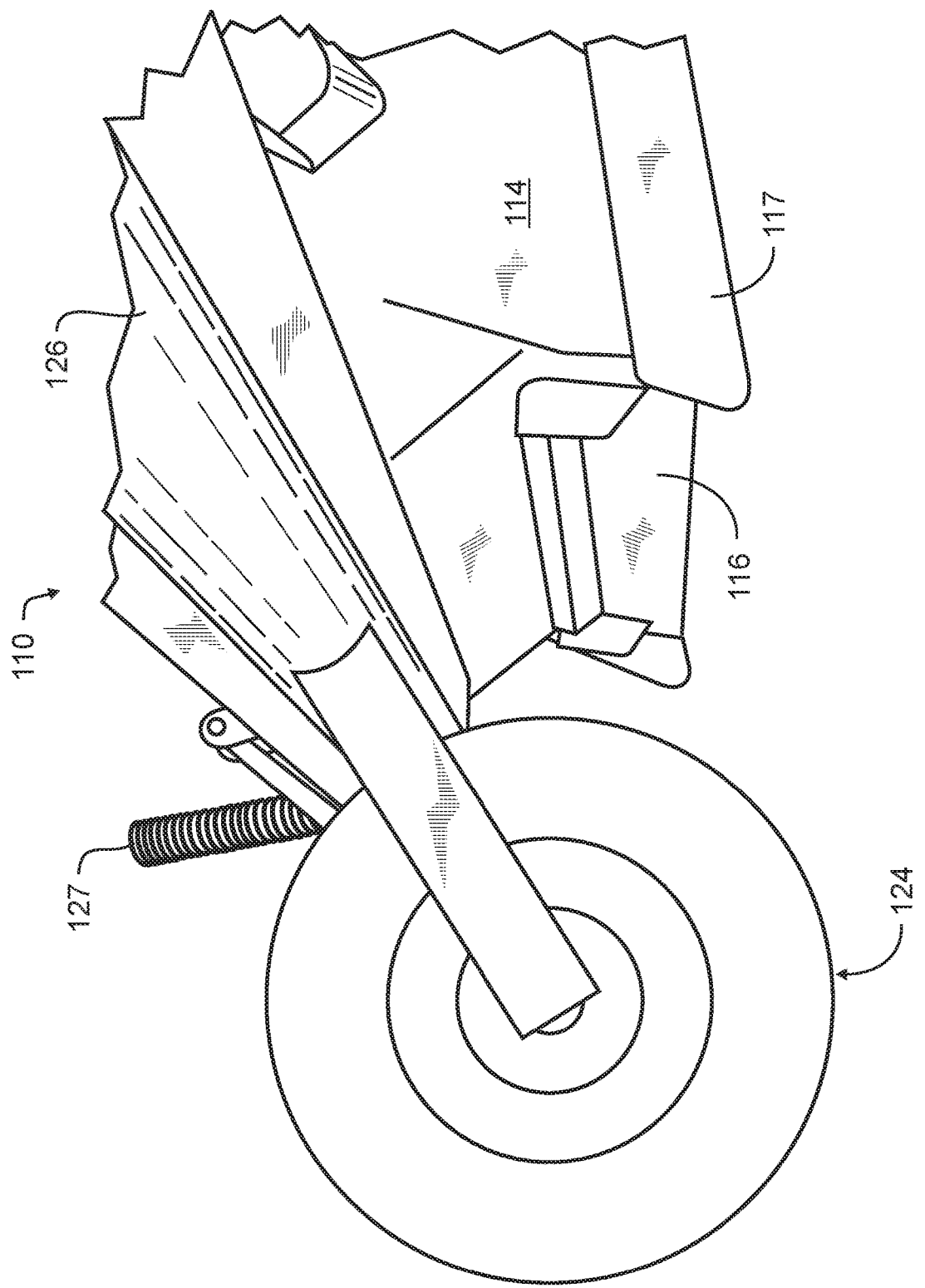

In addition to rigid sealing flanges 117, 118, or as an alternative thereto that can facilitate the use of pliant materials for sealing flanges 117, 118, a ground tracking wheel 124 visible in FIGS. 5 and 6 is provided that may be lowered by rotation of shaft 126 to adjust just how closely cob lift 110 tracks to the surface of the earth. While a single wheel is illustrated, it will be appreciated that in alternative embodiments additional wheels may depend from shaft 126 if desired. Nevertheless, it is highly preferred that wheel 124, and any additional wheels, still track behind trailing plate 116, so that all debris is removed from the earth prior to wheel 124 passing, so that wheel 124 actually tracks with the earth and does not ride up on errant cobs or the like.

As may be apparent, since pliant skirt 111 can flex and fold out of the way of obstacles, and since each of sealing flanges 117, 118 may independently lift when a high spot or obstacle is traversed, similar consideration must be provided for trailing plate 116. In the embodiment of FIG. 5, trailing plate 116 is a pliant flapper similar to pliant skirt 111 that may flex over objects and obstacles. In an alternative embodiment illustrated in FIG. 6, trailing plate 116 is a steel flap that hinges about an upper pivot parallel to the earth, so that the bottom edge that is also parallel to the earth is able to move from front to rear and thereby pivot up and over soil clumps and rocks. Most preferably, trailing plate 116 is also height adjustable, to control the amount of air that may be drawn between trailing plate 116 and the earth to accommodate different soil and corn varieties.

FIG. 5 illustrates the interior of cob lift 110, showing the enclosure defined by sealing plates 114, 115, trailing plate 116, and sealing flanges 117, 118, but with pliant skirt 111 removed to enable the interior viewing. A rigid chute is defined by front wall 121 in combination with sealing plates 114, 115, and a rigid rear wall 120. Passing through the interior thereof, in a direction transverse to the direction of travel, is a rotary shaft 123 to which are attached a plurality of teeth 122. These teeth 122 are preferably pivotally connected to shaft 123. Shaft 123 would not be visible in the view, but for illustration purposes a partial cut-away has been taken from front wall 121. The pivotal connection between teeth 122 and shaft 123 most preferably comprises a secondary shaft 125 parallel to, slightly laterally displaced from, and fixed in position relative to shaft 123 about which teeth 122 can pivot. Secondary shaft anchors 125a,b are fixed to shaft 123 such as by welding or other suitable technique. This pivotal connection of teeth 122 about secondary shaft 125 allows teeth 122 to extend generally radially from shaft 123, owing to centrifugal forces during rotation of shaft 123, unless or until the teeth 122 encounter a rigid obstacle such as a rock or the like. In such case, teeth 122 will simply pivot about secondary shaft 125, and thereby avoid consequential damage. This ability to pivot is particularly important, since in the preferred embodiment, shaft 123 will be turned at relatively high rotational velocity, allowing teeth 122 to strike corn cobs and propel them from the earth into rigid chute front wall 121. As best visible in FIG. 7 and also in FIGS. 2 and 3, this front wall 121 forms an arc, and will direct all debris propelled by the plurality of teeth 122 ultimately into cross draft separator 130.

Figure 7:
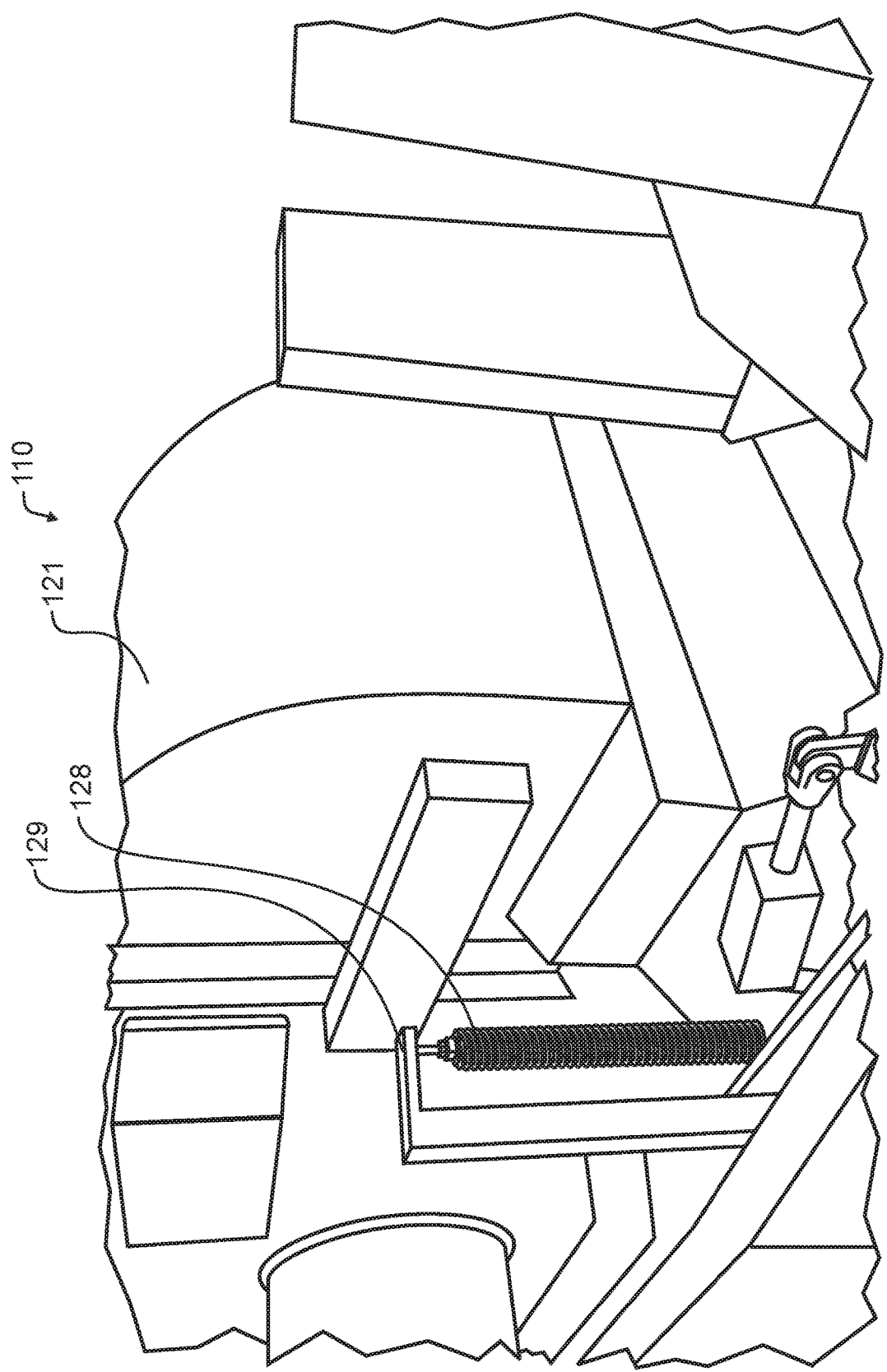

Most preferably, cob lift 110 will substantially float over the surface of the earth, rather than sink into the ground. In addition to wheel 124 providing lift, a plurality of tension springs 127, 128 visible in FIGS. 2, 3, 6, and 7 may be provided. As best illustrated in FIG. 7, the springs may preferably be adjusted to control the amount of lift, such as by tightening or loosening bolt 129 visible in FIG. 7 to either extend or relax tension spring 128. While tension springs 127, 128 are preferred, it will be understood that other resilient or even inelastic members such as counterweights and the like may be used to reduce the load of cob lift 110 toward the earth and thereby facilitate better operation.

Figure 8:
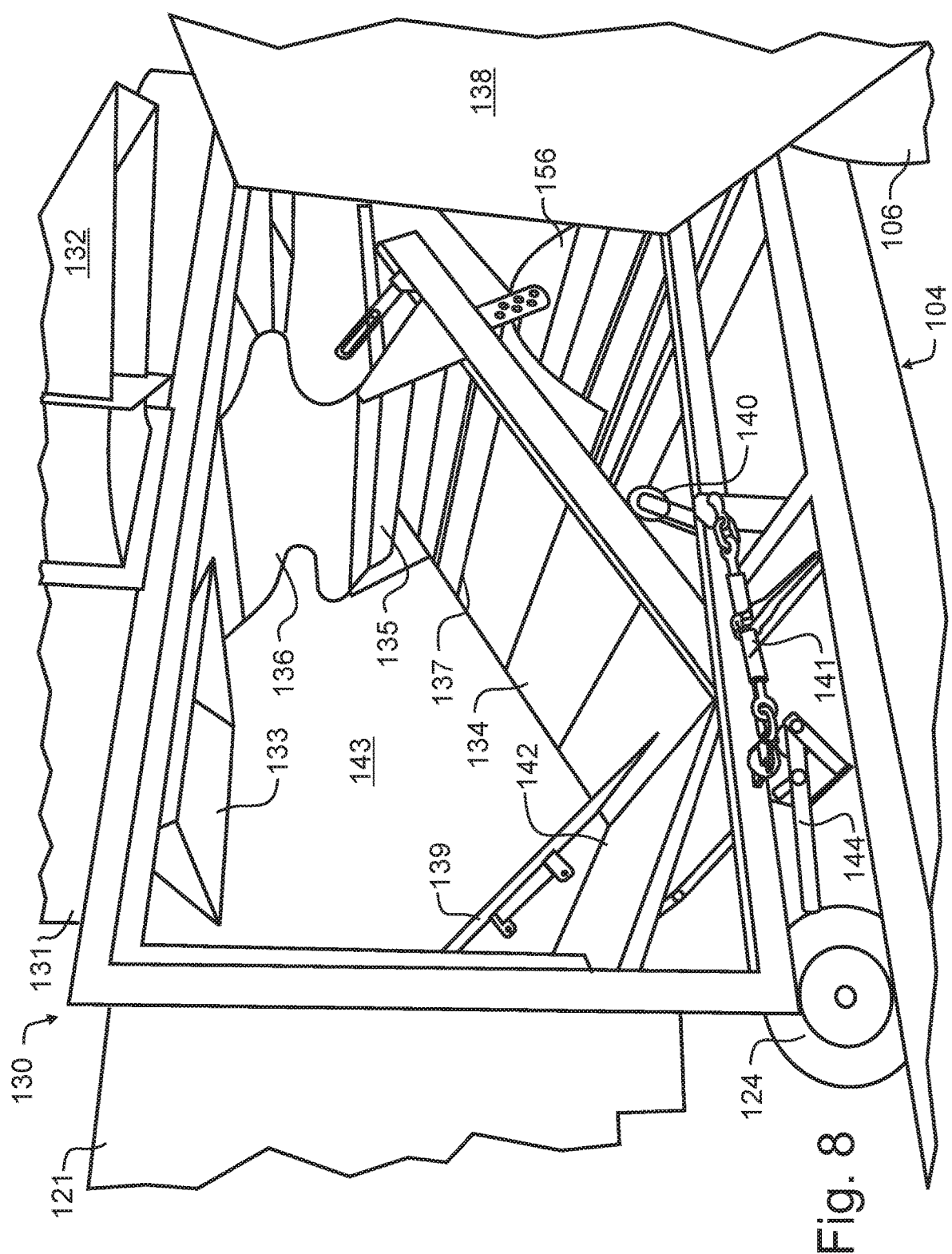
FIG. 8 illustrates a preferred embodiment cross draft separator used in the cob harvester of FIG. 2 from a right side and slight front projected view.

FIG. 8 illustrates a preferred embodiment cross draft separator 130 used in cob harvester 100. Material propelled by the plurality of teeth 122 up from the ground and directed by rigid chute front wall 121 will drop down into cross draft separator 130 onto belt inlet slide 139. Belt inlet slide 139 is preferably slightly pliant, and will vibrate or flex during operation to jostle and thereby keep material from sticking or accumulating to the slide.

Preferably, as the material is propelled to the outlet of chute front wall 121 into cross draft separator 130, a curved flapper is provided that is adjustable. While not directly visible in the Figures, this curved flapper takes the geometry of the top of rigid chute front wall 121 visible in FIG. 3. Flapper adjuster handle 119, also visible in FIG. 3 is used to pivot the flapper so that in one extreme position of travel the flapper has the same shape as and is located immediately adjacent to the top of the chute. When pivoted, the end of the flapper closest to cross draft separator 130 will drop down and thereby deflect the air stream lower. When cobs and other heavier materials hit the curved flapper, they are deflected in a slight downward direction, while the lighter materials tend to stay in the air stream and are sucked upward by the air stream toward blower inlet 133. The air stream is created by blower 131 that draws from pliant skirt 111 within cob lift 110. Lighter materials such as dried husks and leaves are carried into blower inlet 133, through blower 131, and out to discharge chute 132 where the materials may be discharged back onto the ground, or, if so desired, into another trailer, receptacle, or the like.

Material including cobs that are deflected downward will drop from belt inlet slide 139 onto adjustable angle elevating belt 134. Heavier or trapped material that falls onto belt 134 will be carried by belt ribs 137 upward to doctor blade 135. Excess material, such as stacked cobs, will be scraped by doctor blade 135 and tumbled back down toward the lower portion of adjustable angle elevating belt 134. In this natural tumbling process, additional dirt and other light debris will be released and drawn into the air stream passing into blower inlet 133. Any material reduced to a single layer or otherwise thin enough to pass between adjustable angle elevating belt 134 and doctor blade 135 will pass through and in to second stage cross draft separator 150. Optionally and preferably, doctor blade 135 is height adjustable relative to belt 134 to accommodate different varieties of corn. Nearly all dust, stalks, husks, leaves, and other light debris will be removed within cross draft separator 130. In preferred embodiment cob harvester 100, approximately 80-90% of this debris is removed within cross draft separator 130.

To control where air is drawn from, openable side wall 138 and fixed side wall 143 will form side enclosures. Adjustable angle elevating belt 134 and air flow dam 142 will operatively block air flow from the bottom side. Air flow dam 142 is preferably pivotal by pivoting adjuster arm 144. This adjustment allows a person to adjust an amount of air that may flow in adjacent to and between air flow dam 142 and belt 134. This air inlet can provide additional shear and removal of lighter matter. In some cases it may also be desirable to provide a partially permeable belt material. In such cases, the capacity of blower 131 may need to be increased, to compensate for the greater air flow, in order to maintain a desired air flow through cob lift 110. Air of course will be drawn in through the forward edge of cross draft separator 130, being received adjacent to rigid chute front wall 121 from cob lift 110. Flexible air barrier 136 will prevent undesirable movement of air and debris between cross draft separator 130 and second stage cross draft separator 150. However, since blowers 131, 151 will normally both be operating, there may be less pressure differential between cross draft separators 130, 150 than between either one and the outside.

The adjustable angle elevating belt 134 of cross draft separator 130 brings material picked up by cob lift 110 closer into the air stream created by blower 131, allowing the material to tumble along the belt while lighter materials are removed by the air stream. If so desired, in preferred embodiment cob harvester 100 the angle of adjustable angle elevating belt 134 may be increased or decreased by adjusting the position of belt angle adjuster roller 140. This may, for exemplary and non-limiting purposes, be accomplished by adjusting ratcheting turnbuckle 141.

Figure 9:
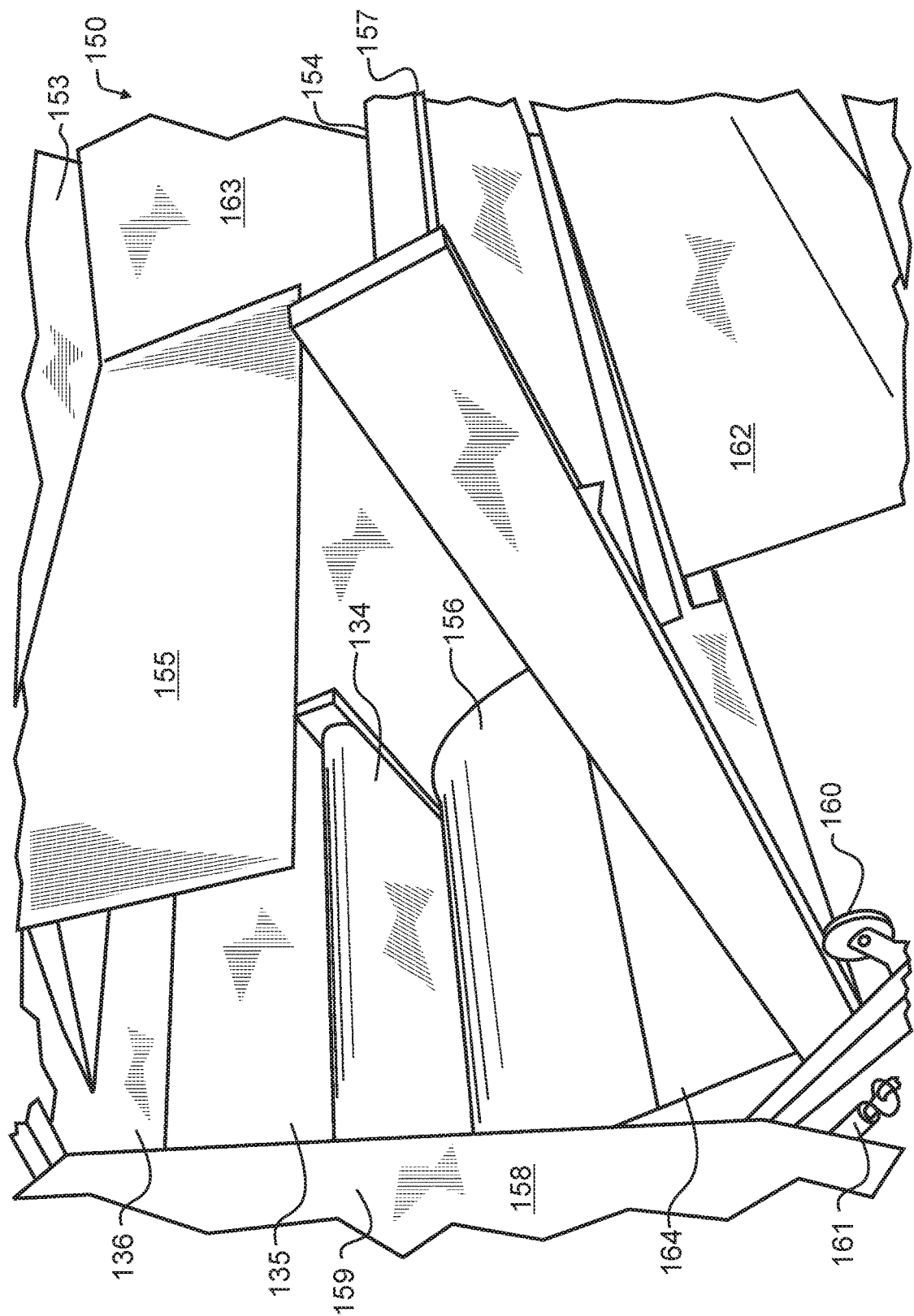
FIG. 9 illustrates a preferred embodiment second stage cross draft separator used in the cob harvester of FIG. 2 from a right side and rear projected view.

FIG. 9 illustrates the interior of second stage cross draft separator 150 used in preferred embodiment cob harvester 100. Heavier, more dense matter such as rocks that are carried by adjustable angle elevating belt 134 into second stage cross draft separator 150 will be guided by deflector 156 and allowed to drop through rock trap opening 164 onto the earth below. As the material drops, any remaining lighter material such as dried husks and leaves will be pulled into the air stream created by blower 151 that draws from rock trap opening 164. A small gap between deflector 156 and belt 134 allows a knife of air to pass between, which provides additional shear to remove the lighter materials.

In an alternative embodiment contemplated herein, a conveyor is provided adjacent to the bottom of deflector 156, to receive the heavier, more dense matter. The conveyor may then be configured to run in a direction transverse to the direction of travel, which is also transverse to the longitudinal axis of preferred embodiment second pass corn cob harvesting machinery 1. Any heavier, more dense matter, which will typically include rocks, dirt, and corn, may then be conveyed and collected in a separate hopper. This heavier, more dense matter may simply be carried about until a suitable destination is reached to unload and sort the matter. However, in a further alternative embodiment, additional separation equipment may be provided on board, permitting rocks and dirt to be discharged, and kernel corn to be collected and retained.

Significant shear in the air stream is also provided by air guide and material deflector 155, which ensures that intermediate materials such as corn cobs will be caught sufficiently in the air stream to be deflected onto adjustable angle elevating belt 154, while the lighter material will be drawn directly into blower inlet 153, through blower 151, and out to discharge chute 152 where it may be discharged back onto the ground, or, if so desired, into another trailer, receptacle, or the like.

Intermediate material that falls onto adjustable angle elevating belt 154 will be carried by belt ribs 157 upward. As noted, the shear adjacent to the lower end of air guide and material deflector 155 will tend to lift the light debris therefrom. The cobs will continue to travel upward along belt 154. The angle of adjustable angle elevating belt 154 may be adjusted to control how directly the cobs travel. When the incline is greater, the cobs will tend to tumble more before being dropped off the upper end of adjustable angle elevating belt 154. The angle of adjustable angle elevating belt 154 may therefore be used to control how quickly the cobs are discharged, with there being an optimum angle at which the debris will be removed. Too steep an angle, and the cobs will simply accumulate and pile up until the interior space within second stage cross draft separator 150 is filled. As may be apparent, this does not effectively remove light debris. Too flat an angle, and there will be no tumbling, meaning that debris may get trapped between a corn cob and the belt, for example. Therefore, with the optimum angle there will be a continuous flow and discharge of cobs, without any significant accumulation, but with sufficient tumbling to ensure dirt and other light debris will be released and drawn into the air stream passing into blower inlet 153.

To control where air is drawn from, openable side wall 158 and fixed side wall 163 will form side enclosures. Adjustable angle elevating belt 154 and air flow dam 162 will operatively block air flow from the bottom side, though air will pass through rock trap opening 164. The size of rock trap opening 164 is also adjustable, through a pivotal arm 165 visible in FIG. 3 adjacent to wheel 106.

As with belt 134, in some cases it may be desirable to provide a partially permeable belt material for belt 154. In such cases, the capacity of blower 151 will need to be increased, to compensate for the greater air flow, in order to maintain a desired air flow past the lower edge of air guide and material deflector 155.

The angle of adjustable angle elevating belt 154 may be increased or decreased by adjusting the position of belt angle adjuster roller 160. This may, for exemplary and non-limiting purposes, be accomplished by adjusting ratcheting turnbuckle 161.

Optionally, there may also be one or more side wall inspection windows 159, such as illustrated in FIG. 3. These inspection windows 159 provide external viewing of the status and processing within each of the cross draft separators 130, 150. As noted herein above, it is preferable to tumble but not excessively accumulate corn cobs within each separator. Inspection windows 159 provide a way to externally observe whether the inclination of each of belts 134, 154 is as desired. Cleaned corn cobs exiting from adjustable angle elevating belt 154 will preferably be carried upon a conveyor 170 visible for example in FIGS. 2 and 3 that elevates the cobs out of preferred embodiment cob harvester 100 and, for exemplary purposes only and not limiting the present invention solely thereto, into a high dump trailer pulled behind second pass corn cob harvesting machinery 1.

As noted herein above, drive power for preferred embodiment cob harvester 100 is provided through the tractor PTO, which in turn drives power take-off hydraulic pump 102. Preferred embodiment cob harvester 100 preferably has an entirely self contained hydraulic system. As a result, belts 134, 154 may preferably be hydraulically driven, and may also be variable speed. Similarly, blowers 131, 151 may be closed loop hydraulically controlled for optimal performance.

While a hydraulic system is most preferred, owing to the durability, safety, and reliability inherent in such systems, and the familiarity to which those working in agriculture have with such systems, other types of power control and transmission may be provided. For exemplary purposes only, and not solely limiting the present invention thereto, electrical systems may be used in an alternative embodiment.

There are a number of benefits that are derived from the present invention. These benefits may preferably be found in most embodiments, though the invention may not necessitate or provide all benefits in all embodiments. One of the benefits is the ability to allows corn cobs to dry in the field after the corn is harvested, thereby facilitating storage without the need for other provision of energy to dry the cobs. Another benefit is that the present invention does not interfere with or slow down the harvest of corn, while still enabling corn cobs to be harvested. Since the preferred embodiment cob harvester 100 is driven by a common farm tractor, embodiments of the invention may typically be produced for lower cost than if the machine was entirely self-propelled and self-powered. The cobs harvested in the present manner may be used for exemplary and non-limiting purposes as animal bedding, as a fuel source for heating, or for compost. The cobs are preferably picked up dry, so they may be directly stored. Furthermore, they are also available for immediate use.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

We claim:

1. A cob harvester adapted to lift corn cobs and chaff from within a corn harvester combine chaff windrow formed on the surface of the earth and clean and separate said corn cobs from said chaff, comprising:
   a cob lift positioned immediately adjacent to and above the surface of the earth and adapted to lift said corn cobs and chaff from said corn harvester combine chaff windrow;
   a first cross draft separator adapted to receive said lifted corn cobs and chaff from said cob lift and separate chaff therefrom; and
   a second cross draft separator adapted to receive said chaff-separated corn cobs and chaff and separate chaff therefrom and thereby generate said cleaned and separated corn cobs; and, a discharge conveyor adapted to discharge said cleaned and separated corn cobs from said corn harvester.

2. The cob harvester of claim 1, further comprising a rock trap adapted to receive said chaff-separated corn cobs and chaff from said first cross draft separator and separate rocks therefrom to generate rock and chaff-separated corn cobs and chaff, wherein said chaff-separated corn cobs and chaff received by said second cross draft separator further comprises said rock and chaff-separated corn cobs and chaff generated by said rock trap.

3. The cob harvester of claim 1, further comprising:
   a frame; and
   a wheel set affixed to said frame;
   said cob lift supported by and floating with respect to said frame immediately adjacent to the earth.

4. The cob harvester of claim 3, further comprising:
   a harvester-supported coupling hitch affixed to said frame and adapted to removably couple to a tractor-supported trailer hitch; and
   a harvester-supported trailer hitch affixed to said frame distally from said harvester-supported coupling hitch.

5. The cob harvester of claim 1, wherein said cob lift further comprises:
   a blower adapted to generate a vacuum within said cob lift; and
   a rotary paddle adapted to lift and throw cobs into said first cross draft separator.

6. The cob harvester of claim 5, wherein said cob lift further comprises:
   a pliant skirt adjacent to said earth surface and adjacent to a leading edge of said cob lift;
   a trailing plate distal to said pliant skirt adjacent to said earth surface and adjacent to a trailing edge of said cob lift;
   first and second opposed side wall sealing plates adjacent to said earth surface and extending generally between said pliant skirt and said trailing plate; and
   a first sealing flange affixed to and suspended from said first side wall sealing plate; and
   a second sealing flange affixed to and suspended from said second side wall sealing plate,
   said rotary paddle located generally between said pliant skirt and said trailing plate, and also located generally between said pliant skirt and said trailing plate.

7. The cob harvester of claim 6, wherein said pliant skirt further comprises a plurality of fingers.

8. The cob harvester of claim 6, wherein said first cross draft separator further comprises an adjustable angle elevating conveyor belt adapted to elevate said lifted corn cobs and chaff closer to said blower, said lifted corn cobs and chaff operatively tumbled on said adjustable angle elevating conveyor belt while a lighter subset of said lifted corn cobs and chaff is separated from a remainder of said lifted corn cobs and chaff, said lighter subset of said lifted corn cobs and chaff removed from said remainder of said lifted corn cobs and chaff by a flow of air created by said blower.

9. The cob harvester of claim 8, further comprising a self-contained hydraulic system adapted to receive power from a tractor power take off and pump hydraulic fluid operative to drive and variably speed control said adjustable angle elevating conveyor belt and said blower.

10. The cob harvester of claim 8, wherein said first cross draft separator further comprises:
    a doctor blade adjacent to an elevated discharge end of said adjustable angle elevating conveyor belt and spaced from said adjustable angle elevating conveyor belt by a distance adapted to tumble at least some of said lifted corn cobs and chaff on said adjustable angle elevating conveyor belt;
    an air flow dam adjacent to a low inlet end of said adjustable angle elevating conveyor belt; and
    an adjuster adapted to adjust air flow past said air flow dam into said first cross draft separator.

11. The cob harvester of claim 10, wherein said first cross draft separator further comprises a belt angle adjuster roller adapted to adjust an angle of said adjustable angle elevating conveyor belt.

12. The cob harvester of claim 11, wherein said first cross draft separator further comprises a flexible air barrier coupled between said adjustable angle elevating belt and an outer wall, said flexible air barrier and said outer wall cooperatively impeding airflow between said first cross draft separator and said second cross draft separator.

13. The cob harvester of claim 5, further comprising:
    a flap intermediate between said rotary paddle and said blower; and
    a flap angle adjuster adapted to change an angle of said flap relative to an air flow between said rotary paddle and said blower.

14. A second pass corn cob harvesting machine adapted to lift corn cobs and chaff from within a corn harvester combine chaff windrow formed on the surface of the earth and clean and separate said corn cobs from said chaff, comprising, in combination, a tractor, a cob harvester, and a trailer configured to receive corn cobs lifted and cleaned by said cob harvester,
    said tractor having:
       a tractor-supported trailer hitch;
       a motive drive system having an engine and configured to move said tractor and an implement coupled to said trailer hitch; and
       a power take off configured to transmit power from said engine to said implement coupled to said trailer hitch;
    said cob harvester having:
       a frame;
       a wheel set affixed to said frame;
       a harvester-supported coupling hitch affixed to said frame and removably coupled to said tractor-supported trailer hitch;
       a harvester-supported trailer hitch affixed to said frame;
       a floating cob lift immediately adjacent to the earth, supported by and floating with respect to said frame, said floating cob lift adapted to lift said corn cobs and chaff from said corn harvester combine chaff windrow;

a first cross draft separator adapted to receive said lifted corn cobs and chaff from said floating cob lift and separate chaff therefrom;

a rock trap adapted to receive said chaff-separated corn cobs and chaff from said first cross draft separator and separate rocks therefrom;

a second cross draft separator adapted to receive said rock and chaff-separated corn cobs and chaff from said rock trap and separate chaff therefrom and thereby generate said lifted and cleaned corn cobs; and a discharge conveyor adapted to discharge said lifted and cleaned corn cobs from said cob harvester;

said trailer having:

a trailer-supported coupling hitch coupled to said harvester-supported trailer hitch; and a receptacle adapted to receive said lifted and cleaned corn cobs from said cob harvester.

15. The second pass corn cob harvesting machine of claim 14, wherein said floating cob lift further comprises:

a blower adapted to generate a vacuum within said floating cob lift; and a rotary paddle adapted to lift and throw cobs into said first cross draft separator.

16. The second pass corn cob harvesting machine of claim 15, wherein said floating cob lift further comprises:

a pliant skirt adjacent to said earth surface and adjacent to a leading edge of said floating cob lift;

a trailing plate distal to said pliant skirt adjacent to said earth surface and adjacent to a trailing edge of said floating cob lift;

first and second opposed side wall sealing plates adjacent to said earth surface and extending generally between said pliant skirt and said trailing plate; and a first sealing flange affixed to and suspended from said first side wall sealing plate; and a second sealing slidably affixed to and suspended from said second side wall sealing plate, said rotary paddle located generally between said pliant skirt and said trailing plate, and also located generally between said pliant skirt and said trailing plate.

17. The second pass corn cob harvesting machine of claim 16, wherein said first sealing flange is slidably affixed to and suspended from said first side wall sealing plate and is further adapted to slide relative to said first side wall sealing plate into generally continuous engagement with said earth surface.

18. The second pass corn cob harvesting machine of claim 14, wherein said first cross draft separator further comprises:

a blower adapted to generate a vacuum within said floating cob lift;

an adjustable angle elevating conveyor belt adapted to elevate said lifted corn cobs and chaff closer to said blower, said lifted corn cobs and chaff operatively tumbled on said adjustable angle elevating conveyor belt while a lighter subset of said lifted corn cobs and chaff is separated from a remainder of said lifted corn cobs and chaff, said lighter subset of said lifted corn cobs and chaff removed from said remainder of said lifted corn cobs and chaff by a flow of air created by said blower;

a doctor blade adjacent to an elevated discharge end of said adjustable angle elevating conveyor belt and spaced from said adjustable angle elevating conveyor belt by a distance adapted to tumble at least some of said lifted corn cobs and chaff on said adjustable angle elevating conveyor belt;

an air flow dam adjacent to a low inlet end of said adjustable angle elevating conveyor belt; and an adjuster adapted to adjust air flow past said air flow dam into said first cross draft separator.

19. The second pass corn cob harvesting machine of claim 15, further comprising:

a flap intermediate between said rotary paddle and said blower; and a flap angle adjuster adapted to change an angle of said flap relative to an air flow between said rotary paddle and said blower.

* * * * *